(12) United States Patent
Lee

(10) Patent No.: US 7,277,129 B1
(45) Date of Patent: Oct. 2, 2007

(54) PIXEL DESIGN INCLUDING IN-PIXEL CORRELATED DOUBLE SAMPLING CIRCUIT

(75) Inventor: Hae-Seung Lee, Bedford, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 790 days.

(21) Appl. No.: 10/284,938

(22) Filed: Oct. 31, 2002

(51) Int. Cl.
H04N 3/14 (2006.01)
H04N 5/335 (2006.01)
H04N 5/217 (2006.01)
H01L 27/00 (2006.01)

(52) U.S. Cl. .................... 348/308; 348/241; 250/208.1

(58) Field of Classification Search ................ 348/241, 348/300, 302, 308, 307; 250/208.1; 358/513, 358/514, 463
See application file for complete search history.

(56) References Cited

U.S. PATENT DOCUMENTS

| 5,736,886 | A  * | 4/1998  | Mangelsdorf et al. ...... 348/241 |
|-----------|------|---------|-----------------------------------|
| 6,130,423 | A  * | 10/2000 | Brehmer et al. ............ 348/308 |
| 6,424,375 | B1 * | 7/2002  | Fowler ........................ 348/241 |
| 6,532,040 | B1 * | 3/2003  | Kozlowski et al. ......... 348/241 |
| 6,587,142 | B1 * | 7/2003  | Kozlowski et al. ......... 348/241 |
| 6,777,660 | B1 * | 8/2004  | Lee ............................. 348/308 |
| 6,917,027 | B2 * | 7/2005  | Krymski ................... 250/208.1 |
| 6,958,776 | B2 * | 10/2005 | Mendis et al. .............. 348/308 |
| 6,965,707 | B1 * | 11/2005 | Kozlowski ............... 250/208.1 |
| 7,126,636 | B2 * | 10/2006 | Simony ...................... 348/308 |
| 7,133,074 | B1 * | 11/2006 | Brehmer et al. ............ 348/308 |
| 7,145,123 | B2 * | 12/2006 | Lule et al. .................. 348/241 |
| 7,151,475 | B2 * | 12/2006 | Boemler ..................... 348/308 |
| 7,157,682 | B2 * | 1/2007  | Brehmer et al. ............ 348/308 |
| 7,189,955 | B2 * | 3/2007  | Simony ................... 250/208.1 |
| 7,199,828 | B2 * | 4/2007  | Atlas ......................... 348/308 |
| 7,215,369 | B2 * | 5/2007  | Beck et al. ................. 348/308 |
| 2003/0214596 | A1 * | 11/2003 | Simony ...................... 348/308 |
| 2004/0174754 | A1 * | 9/2004  | Lee et al. .................. 365/200 |
| 2005/0057675 | A1 * | 3/2005  | Lee et al. .................. 348/308 |
| 2006/0124830 | A1 * | 6/2006  | Olsen et al. ............. 250/208.1 |
| 2006/0157643 | A1 * | 7/2006  | Bamji et al. ............. 250/208.1 |
| 2006/0284051 | A1 * | 12/2006 | Ko et al. ................. 250/208.1 |

* cited by examiner

*Primary Examiner*—John M. Villecco
(74) *Attorney, Agent, or Firm*—Russell E. Baumann

(57) ABSTRACT

An image sensor having a plurality of pixels, each including a sense node; an output node; a first device, connected to the sense node, producing a signal at the sense node that is proportional to incident light intensity at the pixel; at least one select node to receive a first select signal for selecting the pixel output node from the plurality of pixels; a reset device for resetting the pixel; and a sample and hold circuit including a sample node coupled to the sense node. At least one amplifier is provided, including a first input node to receive an output signal from the output node of a selected pixel and a second input node connected to a reference voltage source provided as a reference to reset a selected pixel. An amplifier output node is connected to couple an amplifier output signal to a selected pixel's sample and hold circuit.

29 Claims, 5 Drawing Sheets

PIXEL DESIGN INCLUDING IN-PIXEL CORRELATED DOUBLE SAMPLING CIRCUIT

BACKGROUND OF INVENTION

This invention relates to image sensor array configurations for reducing image array pixel reset noise. More specifically, the invention relates to pixel designs for resetting pixels in a manner that reduces pixel reset noise.

CMOS image sensors are attractive due to the compatibility with VLSI circuits. However, CMOS imagers have typically higher noise than CCD imagers. While CCD imagers employ correlated double-sampling (CDS) to remove the reset noise commonly referred to as kTC noise, the operation of most CMOS imagers does not allow for true CDS. Instead, uncorrelated double-sampling is typically employed to remove the constant reset level. Unfortunately, this method often actually increases reset noise.

There have been proposed various CMOS pixel designs that incorporate correlated-doubling sampling functionality in the pixel itself. Although such circuits are found to often substantially remove the reset noise, in general such designs require the inclusion of an amplifier device and two additional devices that are necessary within each pixel to provide the CDS functionality. This added circuitry greatly increases the area of the pixel. In particular, the inclusion of a separate amplifier in each pixel substantially increases the size and cost of an imaging array of such pixels. As a result, a tradeoff between CDS functionality and imager array size and cost has typically been required.

SUMMARY OF THE INVENTION

The invention overcomes the limitations and tradeoffs required of conventional CDS functionality with an image sensor having a plurality of pixels. Each pixel includes a sense node and a first device, connected to the sense node, that produces a signal at the sense node that is proportional to incident light intensity at the pixel. Each pixel further includes an output node and at least one select node connected to receive a first select signal for selecting the pixel output node from the plurality of pixels. Further provided at each pixel is a reset device connected for resetting the pixel, and a sample and hold circuit including a sample node coupled to the pixel's sense node.

The image sensor further includes at least one amplifier. Each such amplifier includes a first input node connected to receive an output signal from the output node of a selected pixel and a second input node connected to a reference voltage source provided as a reference to reset a selected pixel. The amplifier further includes an amplifier output node connected to couple an amplifier output signal to the sample and hold circuit of a selected pixel.

With this pixel and image sensor configuration, pixel reset noise and feedthrough error are significantly reduced from that typical of conventional pixel designs. In addition, the pixel sample and hold circuit of the invention enables the storage of a pixel output voltage at that pixel for subsequent correlated double sampling operations; no external storage capacity is required. Further, because the invention does not require the use of an amplifier at each pixel, instead providing for column-wise or row-wise sharing of a single amplifier, cost and chip area are minimized; the amplifier can be connected to accept an output signal from a pixel selected from a column of pixels or selected from a row of pixels. As a result, correlated double sampling of pixel outputs from pixel arrays, such as CMOS pixel arrays, can be efficiently and effectively implemented in a manner not previously attainable.

In implementations of the pixel sample and hold circuit of the invention, each pixel can be provided with a second select node that is connected to receive a second select signal for coupling the output signal of the amplifier to the sample and hold circuit of that pixel. A coupling capacitor can be provided in a connection to couple the incident light intensity signal at the sense node with the sample and hold circuit. In one example, this coupling capacitor is connected to a sample and hold storage capacitor in a voltage divider configuration that enables attenuation of pixel reset noise and pixel feedthrough error. Such can be particularly advantageously implemented with a storage capacitor capacitance that is at least about an order of magnitude less than the capacitance of the pixel coupling capacitor.

The sample and hold circuit can be implemented in a wide range of configurations, e.g., as a capacitor and a switch. The switch can be provided as, e.g., a MOS transistor. The capacitor preferably is implemented as the storage capacitor described above, connected to store an indication of the output voltage of a selected pixel. The reference voltage source that is provided to reset a selected pixel can be provided as any suitable source, e.g., as a reference voltage that is less than the pixel supply voltage.

The column-wise or row-wise amplifier of the invention can be implemented in any suitable configuration, e.g., as a differential amplifier. Here the first input node of the amplifier, connected to receive an output signal from a selected pixel, is implemented as a differential input node. The amplifier can include a switch network that is connected to impose unity gain follower operation of the amplifier when a selected pixel output signal is accepted at the differential node of the amplifier. The amplifier can further be configured with a second amplifier, namely, an actively-loaded differential amplifier, that is connected to control the input-referred offset voltage of the differential amplifier.

DETAILED DESCRIPTION OF THE INVENTION

Figure 1:
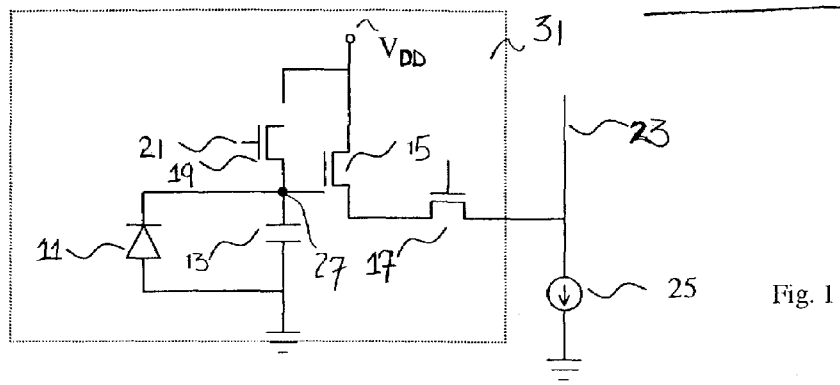
FIG. 1 is a circuit schematic of a conventional active pixel.

FIG. 1 is a schematic diagram of a conventional CMOS active pixel 31. A first device or circuit, for example, a photocircuit such as a photodiode 11, produces a current proportional to the incident light intensity on the pixel. The photocircuit could alternatively produce a proportional voltage or charge. The resulting, e.g., photocurrent, is integrated on a charge sensing capacitor 13. The charge-sensing capacitor 13 may be any source of capacitance, but is typically preferably provided by the parasitic reverse-biased PN junction capacitance associated with the photodiode 11 and other devices in the pixel. During a defined pixel charging period, a row select MOS switch transistor 17 and a MOS reset transistor 19 are both maintained "off."

Then, at the end of a pixel integration period, when a particular row of such pixels in an imager array of pixels is selected for read-out of pixel values, the row select MOS switch transistor 17 is turned "on" to activate a source follower MOS transistor 15. This transistor operates as a source follower that buffers the voltage on the charge-sensing capacitor 13, as taken at a sense node 27, nondestructively to a column line 23. This voltage is delivered to a column line 23 as the output of the pixel. After the output for a selected row of pixels is sensed it is necessary to reset each pixel in the row. To perform the reset of a pixel, the voltage of the gate 21 of the reset transistor 19 is brought up to, typically, $V_{DD}$, the power supply voltage. The charge sensing capacitor 13 is correspondingly then reset to a reset voltage level of approximately $V_{DD}$-$V_T$, where $V_T$ is the threshold voltage of the reset transistor 19.

In general, it is found that the reset voltage level imposed on the charge sensing capacitor can contain error from pixel to pixel. The error has two components. The first component is fixed an error due to mismatches in threshold voltage, $V_T$, from pixel to pixel, and due to differing transistor sizes. The other component is random reset noise on the order of $$\sqrt{\frac{kT}{C}},$$

where C is the capacitance of the charge sensing capacitor 13, and where k is Boltzmann's constant and T is temperature There are two different modes of reset that generally can be employed for resetting a pixel, namely, hard reset and soft reset. In a hard reset mode, the voltage of the gate of the reset transistor is pulled up to a voltage that is an amount, namely, $V_T$, the threshold voltage, higher than the drain voltage of the reset transistor. In this mode, the reset transistor behaves as a resistor producing thermal noise. In soft reset mode, the voltage of the gate of the reset transistor is held at a lower potential so that the reset transistor behaves as a diode, producing shot noise. It has been shown that a hard reset mode produces random noise on the order of $$\sqrt{\frac{kT}{C}}$$

while soft reset contributes noise on the order of $$\sqrt{\frac{kT}{C}}.$$

Because these two noise figures differ only by a small amount, only hard reset will be considered here in more detail for simplicity in the following analysis.

During a reset function, the reset transistor 19 behaves as a resistor with resistance value, R, that depends on the size of the transistor, the transistor threshold voltage, $V_T$, and the voltage level at which the transistor gate is set. The thermal noise spectral density, $S_R(f)$, of a resistor with a value R is given by:

$$S_R(f)=4kTR. \qquad (1)$$

Because the resistor R and the pixel charge-sensing capacitor C constitute a low-pass filter, the noise spectral density at the pixel sense node 27, $S_{27}(f)$, is given as:

$$S_{27}(f) = 4kTR \cdot \frac{1}{1 + (2\pi fRC)^2}. \qquad (2)$$

The mean square noise, $\bar{v}_{27}^2$, produced at the sense node 27 is then found by integrating the noise spectral density, $S_{27}(f)$, over frequency: as $$\bar{v}_{27}^2 = \int_0^\infty S_1(f)df = 4kTR \int_0^\infty \frac{1}{1 + (2\pi fRC)^2} df. \qquad (3)$$

Because $$\int_0^\infty \frac{1}{1 + (2\pi fRC)^2} df = \frac{1}{4RC}, \qquad (4)$$

then the mean-square noise $\bar{v}_{27}^2$ at the pixel sense node 27 is given as:

$$\bar{v}_{27}^2 = \frac{kT}{C}. \qquad (5)$$

The root mean square (rms) value of the reset noise of the pixel at the pixel sense node is thus $$\sqrt{\frac{kT}{C}}.$$

For a typical sense capacitor value of about 10 fF, the rms noise at the pixel node, $\bar{v}_{27}$=643 µV at room temperature.

In principle, both the fixed and random error components of noise described hereto due to reset of the pixel charge-sensing capacitor through the sense node 27 can be removed by correlated double sampling (CDS). In CDS, the pixel voltage is first measured immediately following the pixel reset. This measures the reset level error including both components. This first measurement, i.e., the measured reset value, is stored in either analog or digital form.

After the charge sensing, or integration period, the pixel voltage is remeasured. Because the pixel is not reset again before the second measurement, the second measurement contains the same error components introduced by the earlier reset function, plus a change in voltage in response to light incident on the pixel. The first pixel voltage measurement is subtracted from the second measurement, i.e., the integrated value, leaving only the light response term, and thereby removing the errors from the measurement.

One drawback of CDS is that the first pixel voltage measurement must be stored for the duration of the pixel integration period. Because the integration period can approach the frame period of an imager, the storage circuit must be able to hold the value for this period. For a typical 30 frames/s imager, the maximum storage period is about 33 ms. Thus, analog sample-and-hold circuits employed for this function would require large hold capacitors to achieve such a long hold time. Moreover, because each pixel's reset value must be stored, CDS requires the first pixel voltage measurement values for the entire array of pixels to be stored. A frame buffer is thus necessary. An analog frame buffer requires a large amount of chip area and power consumption. For this reason, most frame buffers are digital. But digital frame buffers also consume large chip area, and are expensive.

To circumvent the problems associated with the CDS, most imagers, and in particular CMOS imagers, employ uncorrelated double sampling (UDS). In this method, the reset pixel voltage measurement corresponding to a next subsequent frame is subtracted from the measurement for the current frame, instead of the earlier reset measurement of the current frame. Because the reset operation for a next subsequent frame occurs immediately after the second pixel voltage measurement of the current frame, there is no need for long storage of voltage measurement values. Typically, the voltage measurement values are in this scenario held in capacitors in a switched-capacitor subtractor.

Although UDS removes the fixed error due to differences in reset threshold voltage, $V_T$, and transistor size mismatches, it does not reduce the random $$\frac{kT}{C}$$

reset noise described above. This is because the reset noise introduced during the reset operation for a next subsequent frame is not correlated with the reset noise of the current frame. Because two uncorrelated noise quantities are present after the subtraction of the two voltage values, UDS actually increases total reset noise power by a factor of two.

Figure 2:
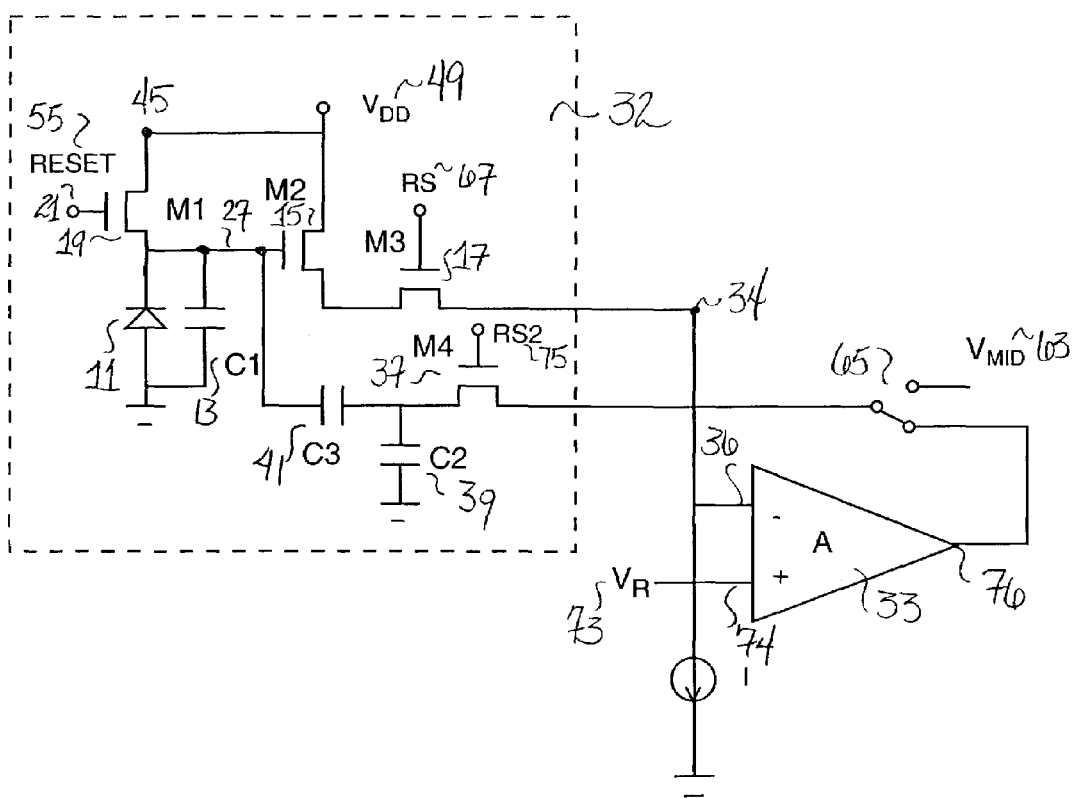
FIG. 2 is a circuit schematic of an active pixel and a corresponding column amplifier provided in accordance with the invention.

FIG. 2 schematically illustrates the circuitry of a pixel 32 and a column amplifier 33 provided by the present invention, for enabling correlated double sampling (CDS) of pixel output voltage while eliminating fixed and random reset noise, and without the need for integration of an amplifier at each pixel. A column amplifier 33 is provided for each column of pixels and may, for example, be a differential amplifier. For clarity, only one pixel 32 taken from a column of pixels corresponding to the amplifier 33 is shown in dotted lines. The output of the pixel 32 is at node 34, the source of source follower transistor M3 17 and is provided to a first input 36 of the column amplifier 33, which as stated above serves all pixels in a given column of pixels.

Compared with the conventional pixel design in FIG. 1, thee additional design elements are added in the pixel design of the invention, namely, the transistor M4 37, a second storage capacitor C2 39, and a coupling capacitor C3 41. Second storage capacitor C2 39 is preferably not provided as an explicit capacitance element, but instead is preferably provided as the parasitic capacitance associated with the transistor M4 37. Alternatively, the gate capacitance of an additional NMOS transistor can be used to obtain a larger storage capacitance. The value of the second storage capacitor C2 39 is preferably about an order of magnitude smaller than the charge sensing capacitor C1 13.

The coupling capacitor C3 41 can be provided by metal overlap in a convenient location of the pixel so that no explicit capacitor element and corresponding extra area are required for this capacitor. The value of the coupling capacitor C3 41 is preferably on the same order as the charge sensing capacitor C1 13. The drain terminal 45 of the reset transistor M1 19 is connected preferably to $V_{DD}$ 49. The source terminal of the reset transistor M1 19 coincides with the sense node 27 of the pixel photodiode 11. The first and second terminals of the reset transistor are designated as a drain or source in the figure but may be interchanged depending on the transistor type and design.

During operation, after the pixel output is sensed at pixel output node 34 for a selected pixel row in an imager array, the pixels of the selected row must be reset. The reset is performed in several steps in accordance with the invention. First, the reset signal RESET 55 is applied to the gate 21 of the reset transistor 19, to bring the reset transistor gate to a reset voltage, $V_{RESET}$, typically $V_{DD}$. The second select signal RS2 75 is applied to transistor M4 37 at a high level, connecting one terminal of C2 39 to a voltage level $V_{MID}$ 63 of switch 65 when the switch is controlled to connect to $V_{MID}$, opposite the switch position shown in the figure. $V_{MID}$ 63 is a fixed voltage, preferably in the middle of the output swing range of the amplifier 33.

This action brings the potential at the sense node 27, coinciding with the gate of the source follower transistor M2 15, to a voltage of approximately $V_{RESET}$-$V_T$, corresponding to a soft reset condition. It is to be recognized that for some imagers, the voltage applied to the reset transistor gate 21 can be made substantially higher then $V_{DD}$, thereby setting the sense node 27 to the voltage at terminal 49, rather then $V_{RESET}$-$V_T$, corresponding to a hard reset condition. The CDS functionality provided by the present invention is applicable regardless of whether the soft or the hard reset modes are employed.

In the second reset step, the voltage level of the signal RESET 55 is lowered, turning the reset transistor M1 19 off. Reset noise on the order of $$\sqrt{\frac{kT}{C}}$$

is injected at this point at the pixel sense node 27. Also, charge feedthrough from the reset transistor M1 19 to the sense capacitor C1 13 introduces a fixed error. This charge feedthrough error may vary from pixel to pixel due to device mismatches. Next, the voltage of a row select signal RS 67 for transistor M3 17 is held high, and the switch 65 is thrown to an opposite position, specifically, to the position as shown in the figure.

A negative feedback loop is produced by this switch position, consisting of the amplifier 33, the transistor M4 37, the capacitors C1 13 and C3 41, the source follower transistor M2 15 and the row select transistor M3 17. This loop forces the voltage at the output 34 of the source follower M2 15 to be $V_R$ 73, a reset reference voltage provided at a second input 74 of the amplifier 33. Finally, in step three, the transistor M4 37 is turned off by lowering the voltage level of the control signal RS2 75.

With this operation, the voltage of the output 76 of the amplifier 33 is sampled and then held on the storage capacitor C2 39. This completes the reset process for a given row of pixels in a pixel array and stores the pixel reset voltage value at the pixel for a subsequent CDS operation. Although the transistor M4 37 can introduce reset noise and feedthrough error when turned off, these errors are attenuated by a voltage divider consisting of the capacitors C1 43 and C2 39. By selecting a size for the capacitor C2 39 that is about an order of magnitude smaller than that of C3 41, attenuation of the reset noise and feedthrough by an order of magnitude can be achieved, in a manner preferred in accordance with the invention.

Assuming that the column amplifier 33 has a sufficiently low noise level, the total reset noise of a pixel provided by the invention, $\bar{v}_n$, is given by:

$$\bar{v}_n = \frac{C2}{C1+C2}\sqrt{\frac{kT}{C3}}. \quad (6)$$

With this configuration, assuming C1=C3=10 fF and C2=1 fF, the total reset noise of the pixel is reduced from about 643 μV for conventional pixel designs to only about 58 μV, or 3.6 electrons. This is a noise reduction of about 11 fold below the noise level that is characteristic of conventional pixel designs.

In addition to the reduction of the reset noise, the feedthrough error component is also reduced in accordance with the invention by the same factor of $$\frac{C2}{C1+C2}.$$

The pixel design of the invention is therefore found to reduce both reset noise and feedthrough error.

Figure 3:
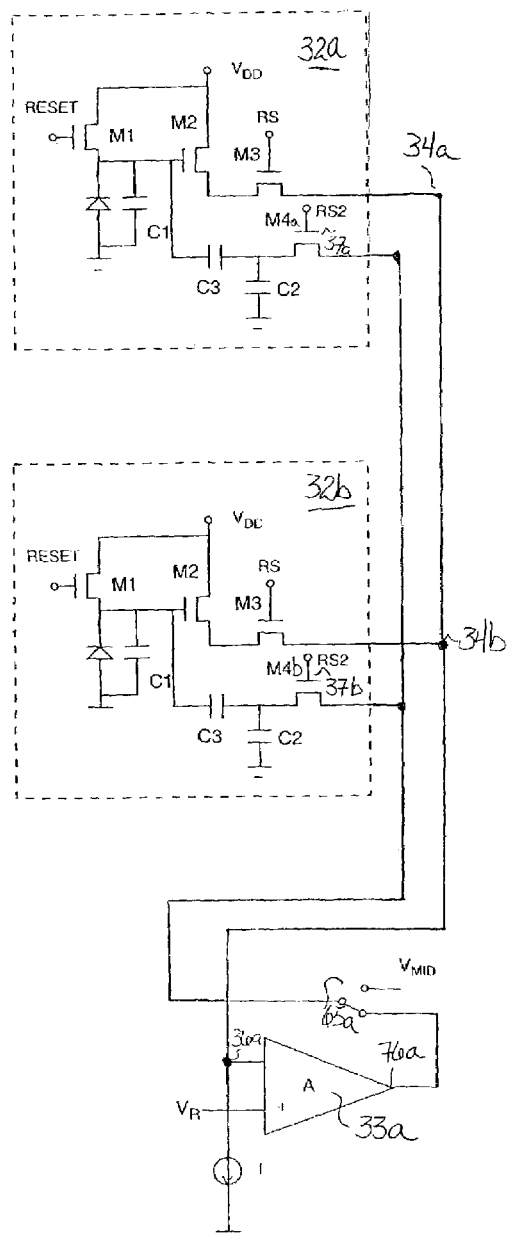
FIG. 3 is a circuit schematic of an example four-pixel array including two pixel columns and two column amplifiers in accordance with the invention.

A 2×2 pixel array example is shown in FIG. 3 to illustrate an example arrangement of pixels, amplifiers, and signal routing in an array of pixels in accordance with the invention. Pixels 32a and 32b provide their outputs, nodes 34a and 34b, to the differential input 36a of a differential amplifier 33a provided for the column of pixels that includes pixels 32a and 32b. Similarly, pixels 32c and 32d provide their outputs, nodes 34c and 34d, to the differential input 36b of a differential amplifier 33b provided for the column of pixels that includes pixels 32c and 32d.

The output 76a of the first differential amplifier 33a is provided through the corresponding switch 65a to terminals of the transistors M4a 37a and M4b 37b, respectively. The output 76b of the second differential amplifier 33b is provided through switch 65b to terminals of the transistors M4c 37c and M4d 37d, respectively. All of the transistor control signals, e.g., the RESET signal, the RS signal, and the RS2 signal, are provided to the corresponding transistors of each pixel in the manner described above.

The column-wise sharing of a single amplifier illustrated in FIG. 3 can also be applied in a row-wise manner. In other words, it is to be recognized that there can be an interchange of the pixel rows and columns and their respective circuit array designs shown in FIG. 3. In this alternate arrangement, the pixels 32a and 32c would provide their outputs, at nodes 34a and 34c, to the input 36b of the second amplifier 33b. Similarly, pixels 32b and 32d would provide their outputs, at nodes 34b and 34d, to the input 36a of the first amplifier 33a. The output of the first amplifier 33a would be provided through the switch 65a to the terminals of the transistors M4b 37b and M4d 37d, respectively. The output of the second amplifier 33b would be provided through the switch 65b to the terminals of the transistors M4a 37a and M4c 37c, respectively.

Figure 4:
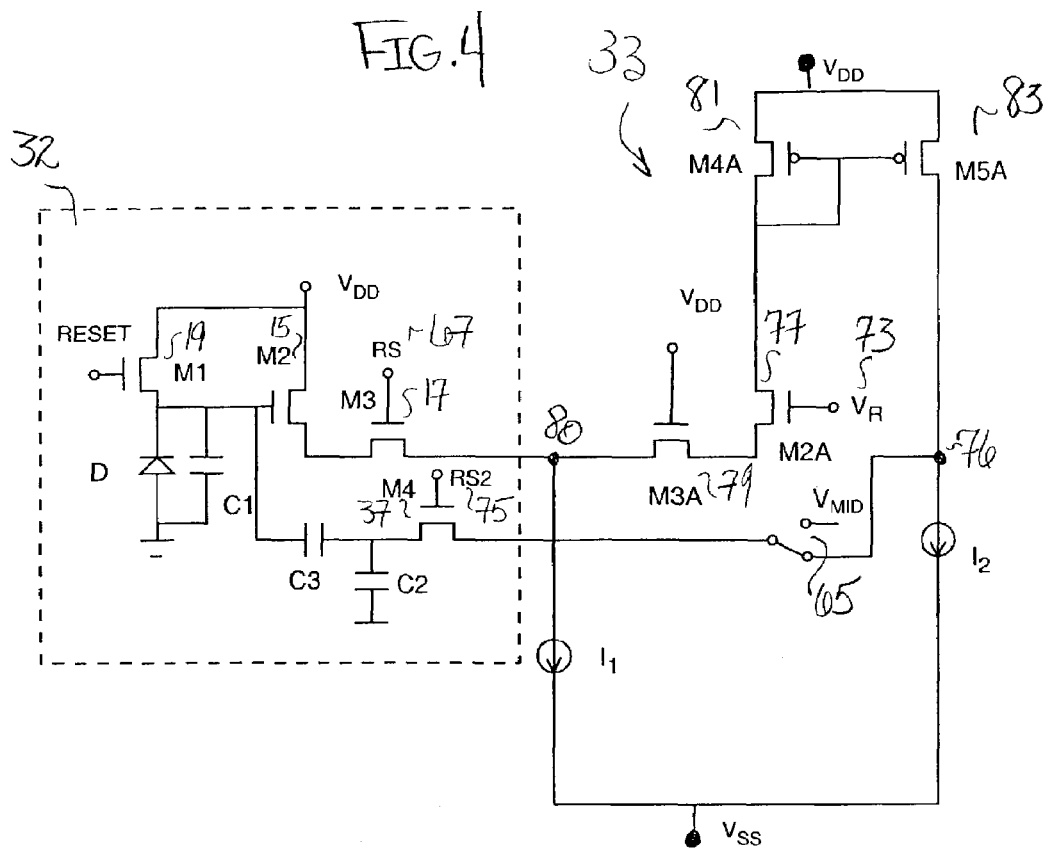
FIG. 4 is a circuit schematic of a pixel in accordance with the invention, here including a first example implementation of the column amplifier of the invention.

Turning to more specifics of the pixel design of the invention and the associated column or line amplifier, FIG. 4 shows one embodiment of the amplifier 33 with a differential input in accordance with the invention as-connected to a pixel 32. The source follower transistor M3 17 and the row select transistor M4 37 operate as the left half of the input to the differential amplifier. The source of the transistor M2 15 is connected to a node 80 through transistor M3 17 when the row select RS 67 is set high for a given row of pixels. The right half of the differential amplifier input consists of the reset reference voltage, $V_R$ 73, which is applied to the gate of transistor M2A 77, i.e., the second differential amplifier input transistor, in series with the transistor M3A 79.

The transistors M3 17 and M3A 79 function as source degeneration resistors for the differential input pair consisting of the transistors M2 15 and M2A 77. The current through the transistor M2A 77 is mirrored by the current mirror provided by transistors M4A 81 and M5A 83. The output 76 of the amplifier 33 is connected to one terminal of the transistor M4 37 through the switch 65 in the manner described above in conjunction with FIG. 2.

Figure 5:
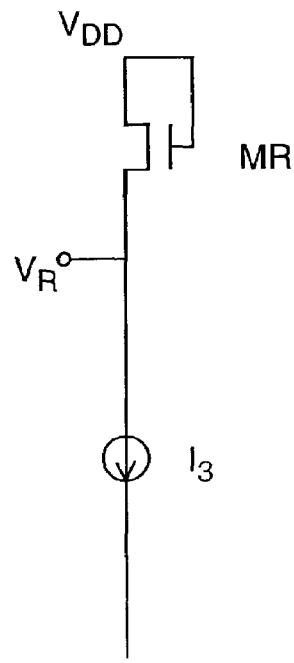
FIG. 5 is a circuit schematic here including an example implementation of a reset voltage generation circuit in accordance with the invention.

The reset reference voltage $V_R$ 73 to be provided at on input of the amplifier 33 is preferably set at a voltage of about $V_T$ below $V_{DD}$ for soft reset and can be generated by a circuit shown in FIG. 5. The current $I_3$ is preferably set very low so that $V_R \approx V_{DD} - V_T$, here the threshold voltage of transistor MR.

Figure 6:
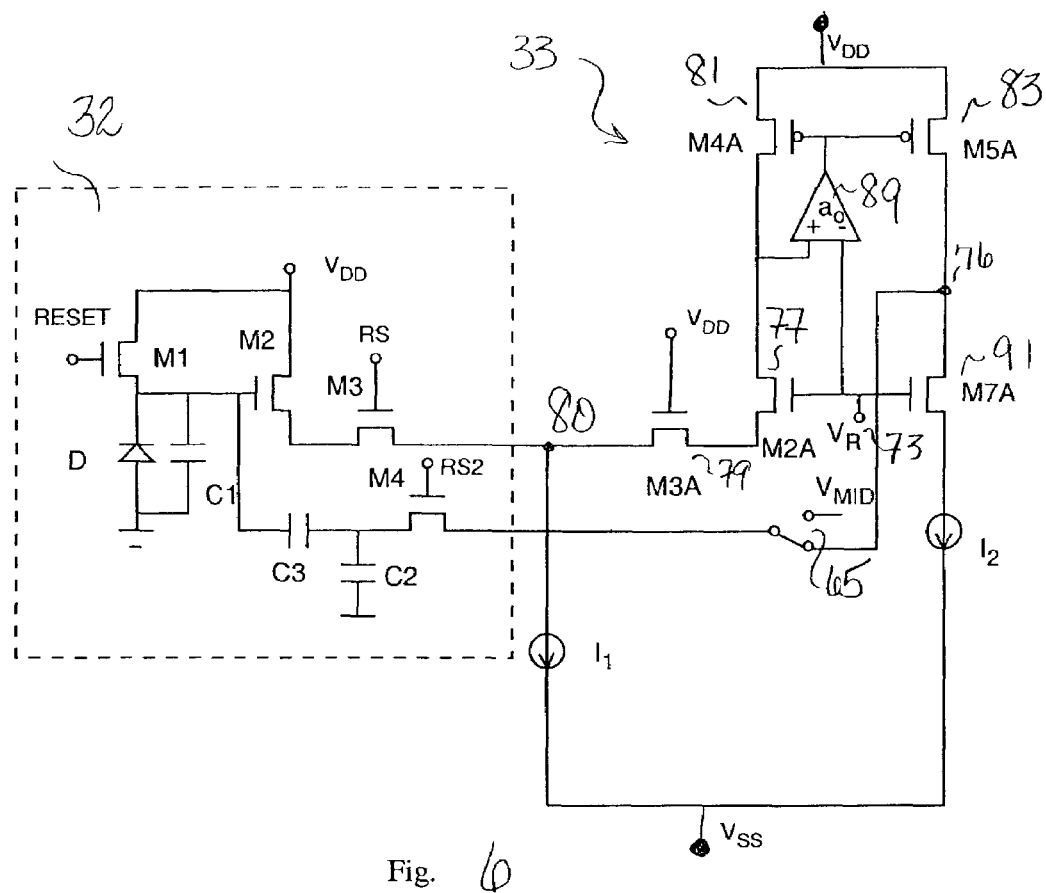
FIG. 6 is a circuit schematic of a pixel in accordance with the invention, here including a second example implementation of the column amplifier of the invention.

A second embodiment of the amplifier 33 is shown in FIG. 6. This embodiment includes an additional amplifier $a_o$ 89 and an NMOS transistor M7A 91. The additional amplifier $a_o$ 89 is provided to maintain the drain voltages of the transistors M2A 77 and M4A 81 at the reset reference voltage $V_R$ 73 so that the drain-to-source voltages of the transistors M4A 81 and M2A 77 are matched to that of transistors M5A 83 and M7A 91, respectively. This improves the input-referred offset voltage of the differential amplifier 33. The second amplifier $a_o$ 89 can be provided as a differential amplifier, and preferably is provided as an actively-loaded differential amplifier.

Figure 7:
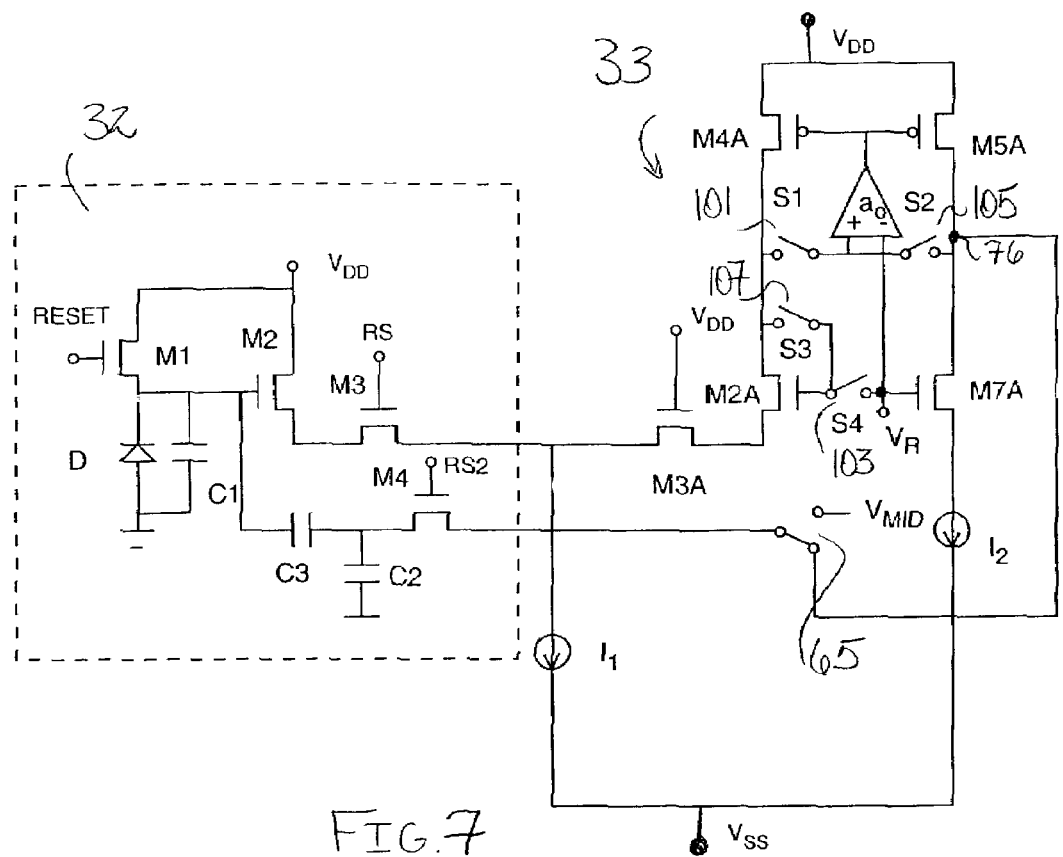
FIG. 7 is a circuit schematic of a pixel in accordance with the invention, here including a third example implementation of the column amplifier of the invention.

FIG. 7 shows an alternative amplifier configuration. In this embodiment, the amplifier 33 is configured differently during the read phase, as a column or row of pixel values is sensed, so that the amplifier 33 operates as a unity-gain follower. Here, during the reset phase, switches S11 01 and S4 103 are closed, while switches S2 105 and S3 107 are open. The circuit 33 thus configured is identical to that in FIG. 6, and the reset is performed in the same manner.

During a read phase for column of pixels the switch positions are reversed, such that switches S1 101 and S4 103 are open, while switches S2 105 and S3 107 are closed. This configures the amplifier circuit 33 into a unity-gain follower so that the output voltage at the amplifier node 76 is a reproduction of the voltage on the sense node 27 of a pixel whose output value is being sensed. It can be shown that the offset voltage of the unity-gain follower configured in this manner is substantially the same as that during the reset modes. The offset voltage of the amplifier is automatically cancelled by the CDS functionality. Like the output switch 65, the circuit configuration switches S1-S4 can be provided as MOS transistors or other suitable design.

The pixel and amplifier designs described above provide significant benefits over conventional pixel designs. As previously explained, reset noise and feedthrough error are significantly reduced; the feedback loop produced by the amplifier circuit elegantly implements a voltage divider configuration for reducing noise. In addition, the pixel sample and hold circuit of the invention enables the storage of a pixel output voltage at that pixel for subsequent correlated double sampling operations. Because the invention does not require the use of an amplifier at each pixel, instead providing for column-wise or row-wise sharing of a single amplifier, cost and chip area are minimized. As a result, correlated double sampling can be efficiently and effectively implemented in a manner not previously attainable.

It is recognized, of course, that those skilled in the art may make various modifications and additions to the pixel designs of the invention without departing from the spirit and scope of the present contribution to the art. Accordingly, it is to be understood that the protection sought to be afforded hereby should be deemed to extend to the subject matter of the claims and all equivalents thereof fairly within the scope of the invention.

I claim:

1. An image sensor, comprising:
   a plurality of pixels, each pixel including,
     a sense node,
     a first device, connected to the sense node, that produces a signal at the sense node that is proportional to incident light intensity at the pixel, an output node,
     at least one select node connected to receive a first select signal for selecting said pixel output node from said plurality of pixels,
     a reset device connected for resetting said pixel, and
     a sample and hold circuit including a sample node coupled to said sense node, wherein said sample and hold circuit comprises a capacitor and a first switch;
   at least one amplifier, each amplifier including,
     a first input node connected to receive an output signal from the output node of a selected pixel,
     a second input node connected to a reference voltage source provided as a reference to reset a selected pixel, and
     an amplifier output node connected to couple an amplifier output signal to said sample and hold circuit of a selected pixel;
   a second select node connected to receive a second select signal for coupling said output signal of said amplifier to said sample and hold circuit of the selected pixel; and
   a second switch coupled, in series, between said sample and hold circuit and said amplifier output node to provide the amplifier output signal from said amplifier output node, through said second switch, to said sample and hold circuit.

2. The image sensor of claim 1 wherein said amplifier is connected to accept, at the first amplifier input node, an output signal from the output node of a pixel selected from a column of pixels of the image sensor.

3. The image sensor of claim 1 wherein said amplifier is connected to accepts at the first amplifier input nodes an output signal from the output node of a pixel selected from a row of pixels of the image sensor.

4. The image sensor of claim 1 wherein said plurality of pixels comprise a plurality of CMOS pixels.

5. The image sensor of claim 1 wherein said first device comprises a photodiode.

6. The image sensor of claim 1 wherein said reset device comprises a reset transistor one node of which is connected to said first device.

7. The imager sensor of claim 1 wherein said amplifier output signal provides an indication of pixel output voltage of a selected pixel.

8. The image sensor of claim 1 wherein said pixel further includes a coupling capacitor connected to couple said incident light intensity signal at said sense node with said sample and hold circuit.

9. The image sensor of claim 8 wherein the pixel coupling capacitor is connected to a sample and hold circuit storage capacitor in a voltage divider configuration for attenuating pixel reset noise and pixel feedthrough error.

10. The imager sensor of claim 9 wherein the sample and hold circuit storage capacitor is of a capacitance that is at least about an order of magnitude less than capacitance of the pixel coupling capacitor.

11. The image sensor of claim 9 wherein said sample and hold circuit storage capacitor comprises a storage capacitor connected to store an indication of pixel output voltage of a selected pixel.

12. The image sensor of claim 9 wherein said first switch comprises a MOS transistor.

13. The image sensor of claim 1 wherein said amplifier comprises a differential amplifier.

14. The image sensor of claim 13 wherein the first input node of said differential amplifier, connected to receive an output signal from the output node of a selected pixel, comprises a differential input node.

15. The image sensor of claim 13 wherein said differential amplifier includes a switch network connected to impose unity gain follower operation of said differential amplifier when a selected pixel output signal is accepted at the differential input node of the differential amplifier.

16. The image sensor of claim 13 further including an actively-loaded differential amplifier connected to the differential amplifier to control input-referred offset voltage of the differential amplifier.

17. The image sensor of claim 1 wherein the reference voltage source provided as a reference to reset a selected pixel comprises a reference voltage that is less than a pixel supply voltage.

18. A method, comprising:
    resetting a pixel, wherein resetting the pixel injects read noise at a sense node of the pixel;
    sampling an output voltage at an output of an amplifier coupled to an output node of the pixel;
    controlling a first switch to couple a sample and hold circuit to a second switch, wherein the second switch is coupled to the output of the amplifier; and
    controlling the second switch to couple the sample and hold circuit to a reference voltage source, wherein the reference voltage source is within an output swing range of the amplifier.

19. The method of claim 18 further comprising applying a select signal to the first switch to control the first switch, wherein the first switch comprises a MOS transistor.

20. The method of claim 18 wherein resetting the pixel comprises: applying a reset signal to a reset transistor of the pixel to reset a sense node of the pixel to a reset voltage less than a power supply voltage of the pixel; and implementing a soft reset of the pixel.

21. The method of claim 18 wherein resetting the pixel comprises:

applying a reset signal to a reset transistor of the pixel to reset a sense node of the pixel to a reset voltage greater than a power supply voltage of the pixel; and implementing a hard reset of the pixel.

22. The method of claim 18 further comprising storing the sampled output voltage on a storage capacitor of the sample and hold circuit.

23. The method of claim 22 further comprising using the sampled output voltage to provide correlated double sampling functionality to the pixel.

24. The method of claim 18 further comprising producing a negative feedback loop which includes the amplifier, the first and second switches, the sample and hold circuit, a source follower transistor of the pixel, and a row select transistor of the pixel.

25. An apparatus, comprising:

means for controlling a first switch coupled between a sample and hold circuit and an output node of an amplifier, wherein an input of the amplifier is coupled to an output node of a pixel;

means for controlling a second switch coupled, in series, between the sample and hold circuit and the output node of the amplifier to provide an amplifier output signal from the output node of the amplifier, through the second switch, to the sample and hold circuit said means for controlling the second switch coupled between the sample and hold circuit and a reference voltage source; and means for attenuating reset noise and feedthrough error of the pixel.

26. The apparatus of claim 25 further comprising means for resetting the pixel.

27. The apparatus of claim 25 further comprising:

means for sampling an output voltage at the output node of the amplifier; and means for storing the sampled output voltage in the sample and hold circuit.

28. The apparatus of claim 25 further comprising means for removing fixed and random error components of noise from an integrated voltage of the pixel.

29. The apparatus of claim 25 further comprising means for coupling the input of the amplifier to a plurality of output nodes of a corresponding plurality of additional pixels.

* * * * *